Aug. 11, 1931.    G. E. SEIL    1,818,871
GAS PURIFICATION MATERIAL AND METHOD OF MAKING THE SAME
Filed Dec. 18, 1928
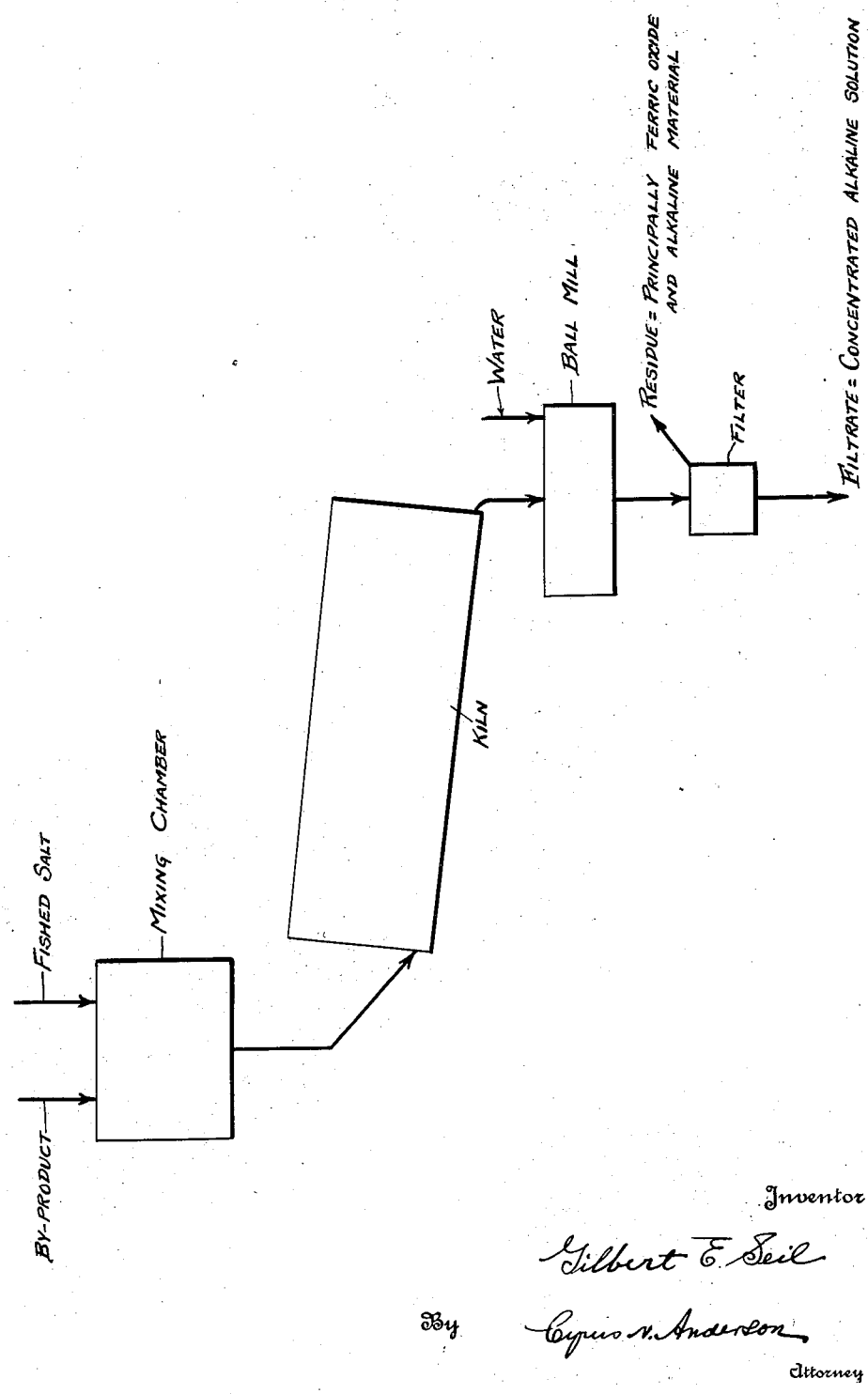

Patented Aug. 11, 1931

1,818,871

UNITED STATES PATENT OFFICE

GILBERT E. SEIL, OF CONSHOHOCKEN, PENNSYLVANIA, ASSIGNOR TO E. J. LAVINO AND COMPANY, OF PHILADELPHIA, PENNSYLVANIA, A CORPORATION OF DELAWARE

GAS PURIFICATION MATERIAL AND METHOD OF MAKING THE SAME

Application filed December 18, 1928. Serial No. 326,896.

My invention relates to a material consisting principally of ferric oxide, which, while capable of being employed for a large variety of purposes, is especially well adapted for use as a gas purification material, and the said invention has particular relation to a method of making such material.

In the chemical and other arts large quantities of materials consisting principally of ferric oxide are employed for various purposes. For example, such materials are used as purifying agents in the manufacture of gaseous mixtures for removing hydrogen sulphide gas from such mixtures. The ferric oxide which is present in the said materials reacts with the hydrogen sulphide gas to form ferric sulphide and water which separate from the gaseous mixture.

It is one of the objects of my invention to provide a novel material consisting principally of iron oxide, the chemical activity of which material greatly surpasses that of any similar material which has been produced economically heretofore.

Another object of my invention is to provide a novel material of the above character which possesses a capacity for sulphur which greatly exceeds that of known similar materials.

A further object of my invention is to provide a novel method of producing the material of my invention which is simple, practical and highly economical.

It also is an object of my invention to provide a novel method of producing a material containing ferric oxide, which comprises treating an iron-bearing material to purify the said material and to increase the chemical activity thereof.

Another object of my invention is to provide a novel method of producing a material consisting principally of iron oxide which comprises heating to high temperature an iron-bearing material, and quenching the said material to increase its chemical activity.

A further object of my invention is to provide a novel method for producing a material consisting principally of ferric oxide and for producing simultaneously a purified alkaline substance.

Other objects and advantages of the invention will be set forth in the detailed description thereof which follows or will become apparent therefrom.

To facilitate the description of the invention reference will be made to the accompanying drawing, in which I have illustrated diagramamtically a form of apparatus by which the novel method invented by me may be practiced. But it is to be understood that apparatus other than that which is shown in the drawing may be employed in practicing the said method, and changes may be made in the details of procedure without departing from the invention as defined by the claims.

In carrying out my invention, I first mix iron or iron-bearing material with an excess of an alkali or a concentrated alkaline solution in a suitable mixing chamber, as indicated in the drawing. This iron or iron-bearing material may be of practically any form or composition. I may employ iron borings or filings, or iron ore, and various iron compounds or other substances containing iron may be employed. As an example of an iron-bearing material which may be used I will mention "anilin sludge", a by-product of the anilin dye industry, which contains iron principally in the form of ferrous oxide together with various impurities such as graphite, silica, phosphorus, etc. I also may employ any well known alkali or alkaline solution of varying purity, although I prefer to use for this purpose a by-product known in the art as "fished salt," or a solution thereof. The said "fished salt" consists principally of potassium and sodium carbonates and may not only be obtained economically but possesses the desired property of alkalinity.

It should be remarked at this time that when the finished material of my invention is to be employed as a gas purification material it is desirable that it contain alkaline material, in order to increase its reaction with hydrogen sulphide gas. In other words, the said material has greater capacity for the sulphur of hydrogen sulphide in the presence of an alkaline material. Therefore a certain portion of the total amount of alkali which is added as set forth above, is added for the above purpose and is retained in the material, and the remaining portion of the said alkaline material is recovered in a purified condition, as will hereinafter appear. For this reason it is desirable to add as large a quantity of alkali or concentrated alkaline solution as is commensurate with the total quantity of material which can be handled conveniently and efficiently.

After the said by-product or other iron-bearing material and the alkali or solution thereof have been thoroughly and intimately mixed, the mixture is conducted through a suitable kiln or muffle, as indicated in the drawing. Preferably I employ a rotary cement kiln of the type in which the material and the flames which act thereon move in opposite directions to each other. By employing such a kiln the material may be heated in the desired manner and to the temperature desired.

In heating the material it is important that the temperature of the kiln be so regulated as to produce a material possessing the desired chemical activity. For example, by heating the material to a temperature ranging from approximately 200° C. to 400° C. in the manner described and claimed in my co-pending application Serial Number 284,671, filed June 11, 1928, a material possessing high activity is obtained; if the material is heated to a temperature ranging from approximately 400° C. to approximately 760° C., the material which is produced possesses low activity; but if the material is heated to a temperature ranging from approximately 760° C. to approximately 1200° C., the finished material is found to possess exceptionally high chemical activity; in fact, its capacity for the sulphur of hydrogen sulphide, the facility with which it may be dissolved in acids, and its other characteristics indicate that its activity greatly exceeds that of any similar material which has been produced by the methods heretofore used. Therefore I prefer to heat the material to a temperature ranging from approximately 760° C. to approximately 1200° C.

By heating the mixture of material in the kiln the said mixture will be purified; that is, moisture and other volatile constituents contained therein will be removed, and the carbonaceous material which may be present in the said mixture will be decomposed by the heat to produce carbon and will pass off from the material and out of the kiln in the form of the gas, carbon dioxide.

The period of time during which the mixture of material is heated will be varied with the character of the ingredients thereof or to produce a final product of required character. The total time required for drying, oxidizing and final heating ranges from around one and one-quarter hours to one and one-half hours.

As stated hereinbefore, iron in any form, or iron-bearing material, may be employed, together with an alkali in carrying out my invention. But assuming, for purposes of illustration, that "anilin sludge" and "fished salt" are employed, the foregoing heating treatment of the mixture of the said sludge and "fished salt" also will cause the oxidation of the ferrous oxide of the said sludge to form ferric oxide. Because of the presence of this ferric oxide in the mixture, and the high temperature at which the said mixture is heated, at least a portion of the "fished salt" is decomposed, that is, the sodium and potassium carbonates thereof are converted into sodium and potassium oxides which combine with the ferric oxide to form nodules or lumps of sodium and potassium ferrites, as shown by the following formulas, that is to say,—

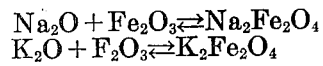

As indicated, the above reaction is reversible, such reversibility depending upon the presence or absence of water. This fact is taken advantage of by introducing the hot material into water, whereupon the ferric oxide is liberated and a solution of sodium and potassium hydroxides is formed. The introduction of the mixture while hot into the water also is beneficial, because experience has shown that by thus quenching the material the chemical activity of the ferric oxide containing material is greatly increased.

While the quenching of the material and the decomposition thereof may be effected in any desirable known manner, I prefer to perform this operation in a ball mill, as indicated in the drawing, because it generally is necessary to grind the material to further increase its activity, and a ball mill or other grinding device affords a convenient means for that purpose. As will be understood, the heated material may be introduced into the ball mill either prior or subsequent to the introduction of the water thereinto.

After the material has been quenched the said ball mill is operated to grind the solid material (principally ferric oxide) present in the alkaline solution into a comminuted or finely divided state. The mass which thus is formed is conducted from the said ball mill to a filter of any known construction, as indicated in the drawing, upon the bed of which the solid material or residue is deposited. The deposited material consists principally of ferric oxide, while the filtrate consists of a concentrated solution of alkali, generally sodium and potassium hydroxides. A sufficient quantity of alkaline substance will remain in the material deposited upon the filter to produce the desired reaction between hydrogen sulphide and the said material when the latter is employed in purifying gaseous mixtures, for which purpose the material may be used upon removal thereof from the bed of the filter.

The composition of the alkaline solution which finally will be obtained will vary according to circumstances. Generally the said solution, which is the filtrate referred to above, will consist of sodium and potassium hydroxides, as stated. But if it be desired to produce a filtrate containing sodium and potassium carbonates, such result may be accomplished by adding a quantity of "fished salt" in excess of that which can be decomposed by the heating of the mixture including the ferric oxide to high temperature, as already described. When such an excess of "fished salt" is added, corresponding amounts of purified sodium and potassium carbonates will be obtained in the said filtrate. Sodium and potassium carbonates also may be produced by exposing to the atmosphere the sodium and potassium hydroxides produced as above set forth. Furthermore, if an excess of "fished salt" is added as stated above, I may produce both carbonates and hydroxides from the said filtrate.

It now will be apparent that I have provided a novel and efficient method of producing or preparing material for the purification of gaseous mixtures to remove therefrom the hydrogen sulphide which may be present therein. The simplicity of my novel method is such as to recommend its employment in the manufacture of large quantities of such material, and the simultaneous production of alkaline compounds further recommends the employment of the said method.

The said material exhibits an unusually high capacity or affinity for the sulphur of hydrogen sulphide when subjected to "fouling" by gaseous mixtures containing the same. As stated hereinbefore, the ferric oxide which is present in the gas purification material reacts with the hydrogen sulphide gas to form ferric sulphide and water. The material which I produce is especially well adapted for effecting this reaction.

On the other hand the product obtained according to the procedure of my invention possesses such qualities and properties as to permit the ferric sulphide which is formed therefrom as above stated, to be easily and quickly oxidized by permitting air to contact intimately therewith by any of the methods well known in the art. That is to say, the said ferric sulphide may be quickly converted into ferric oxide and elemental sulphur by exposing the same to the air, whereupon the said ferric oxide containing material may be employed again for purifying gaseous mixtures. These steps of permitting the "fouling" of the gas purification material and thereafter revivifying the said material as described above, may be repeated from time to time, thereby lengthening the life of the said material and thus effecting substantial economy in the operation of gas purification. These steps or treatment form no part of my invention but are referred to to illustrate and emphasize the value and to indicate the novelty of the product which I obtain in carrying out the novel method of my invention.

While the novel material produced according to the novel method invented by me is especially well adapted for use in the purification of gaseous mixtures, it also is useful for other purposes. For example, the said material may be used as a pigment in cement or in other materials, for example, ceramic material, as a filler and accelerator for rubber, as a catalyst; in fact, it may be used for practically any purpose for which ferric oxide generally is used. As will be understood, when the material of my invention is employed for purposes other than the purification of gaseous mixtures the alkaline compounds may be washed therefrom and the said material washed and dried in known manner, if desirable or necessary.

Having thus described my invention, what I claim and desire to secure by Letters Patent is:

1. The method of preparing a material consisting principally of ferric oxide from an iron-bearing substance, which comprises heating a quantity of the said substance to a temperature ranging from approximately 760° C. to approximately 1200° C., quenching the substance in a liquid, grinding the said substance in the liquid, and subsequently filtering the mass to obtain the said material.

2. The method of preparing gas purification material from "anilin sludge," which comprises mixing a quantity of the said "anilin sludge" with a solution of alkaline material, heating the mixture thus formed to a temperature ranging from approximately 760° C. to approximatly 1200° C., quenching the heated material in a liquid, grinding the said material in the liquid, and subsequently filtering the material therefrom.

3. The method of producing a gas purification material consisting principally of ferric oxide and of producing simultaneously an alkaline substance, which comprises mixing a quantity of "anilin sludge" with a solution of alkaline material, heating the mixture thus formed to a temperature ranging from approximately 760° C. to approximately 1200° C., quenching the heated material in water and causing the alkaline constituents thereof to form an alkaline solution, grinding the said material in the solution and subsequently separating the undissolved portion of the material from the solution to produce a gas purification material containing a portion of the said solution, and to recover the remaining portion of the said alkaline solution.

In testimony that I claim the foregoing as my invention, I have hereunto signed my name this 17th day of December, A. D. 1928.

GILBERT E. SEIL.